United States Patent Office 3,378,484
Patented Apr. 16, 1968

3,378,484
SWEETENING HYDROCARBON LIQUIDS
John M. Ferrara and John E. Ryder, Chicago, Ill., assignors to Howe-Baker Engineers, Inc., Tyler, Tex., a corporation of Texas
No Drawing. Continuation-in-part of application Ser. No. 537,285, Mar. 25, 1966. This application Sept. 23, 1966, Ser. No. 581,434
17 Claims. (Cl. 208—191)

ABSTRACT OF THE DISCLOSURE

A process for sweetening hydrocarbon compositions in which sour hydrocarbons are placed in contact with particulate ion exchange materials containing metal ions at their functional sites. The mercaptans are converted in part to disulfides and in part are taken up by the ion exchange materials.

---

This application is a continuation-in-part of copending application Ser. No. 537,285, which was filed on Mar. 25, 1966, and now abandoned, which was a continuation-in-part of application Ser. No. 494,871, filed on Oct. 11, 1965, and now abandoned, which was a continuation-in-part of application Ser. No. 391,284, filed on Aug. 21, 1964, and now abandoned, which was a continuation-in-part of application Ser. No. 358,086, filed on Apr. 7, 1964, and now abandoned.

The invention, in general, relates to a process for sweetening hydrocarbon compositions. Many hydrocarbon compositions derived from the refining, cracking, reforming, and/or distillation of petroleum oils contain appreciable quantities of mercaptans. These mercaptans are objectionable primarily because of their odor. They are also catalyst-poisoning compounds for several types of catalysts used in the refining, reforming and/or cracking of hydrocarbon compositions.

The effective removal of mercaptans from hydrocarbons has been a vexing problem to the petroleum industry for many years, and many techniques have been proposed for such removal. These techniques have not been entirely successful both with respect to the costs involved and with respect to the results that were achieved.

The principal object of the present invention is to provide an improved process for treating mercaptans that are found in diverse types of hydrocarbon compositions.

Another object of the invention is to provide an economical process for sweetening sour hydrocarbon compositions.

Other objcets will become apparent to those skilled in the art from the following detailed description of the invention.

In general, the present invention is directed to a process for sweetening sour hydrocarbon compositions wherein liquid hydrocarbons are brought into intimate contact with a finely divided particulate solid ion exchange composition which contains a metallic element. More specifically, the invention comprises sweetening hydrocarbons by placing the sour hydrocarbon composition in intimate contact with particulate ion exchange materials containing certain metals ionically bound to said materials. The ion exchange materials that can be used in the subject invention include inorganic aluminosilicates such as natural and synthetic zeolites as well as synthetic organic cation and anion exchange materials. Preferred ion exchange materials include amorphous synthetic zeolites of the formula $Na_2O \cdot Al_2O_3 \cdot 6SiO_2 \cdot xH_2O$ and macroporous sulfonic acid ion exchange resins. The metallic element is one found in Groups I–B, II–B, IV, V, VI, and VIII of the periodic table. The preferred metal ions include cupric, mercuric, silver, lead, cobaltic, ferric, platinum and palladium. The preferred ions are the cupric and mercuric ions and especially the cupric ion. In a particular embodiment of the invention, the sour hydrocarbon compositions are placed in intimate contact with a complex of the metal ion exchange composition.

In the subject process organic mercaptans of the formula RSH are converted by ion exchange, in part, to metal (Me)SR and in part to disulfides of the formula RSSR wherein R in the aforesaid formulae represents the residue attached to the mercapto group of the organic mercaptans. This residue may be an alkyl or alkenyl group of about 1–20 carbons, a cycloalkyl group, a cycloalkenyl group, an aromatic hydrocarbon group, a hydroxy aromatic group, or the like. The particular nature of the group R— is not of critical importance and it is to be understood that the group R represents the residue of diverse types of mercaptans occurring in petroleum oils and/or fractionated or modified fractions thereof.

Natural zeolites are minerals having a continuous framework of linked tetrahedral groupings around silicon and aluminum atoms. The negative charge of this framework is balanced by positive ions in the cavities of the zeolites. Some natural zeolites have well defined crystalline structures. Among the well-known natural zeolites are mordenite, faujasite, chabazite, gmelinite, analcite, erionite, natrolite, stilbite, heulandite, and thompsonite. Glauconite is a ferrous aluminosilicate having ion exchange capacity.

Synthetic zeolites are aluminosilicates of either the fusion or gel type. The fusion types are similar to natural zeolites and are prepared by fusing together mixtures of soda, potash, felspar and kaoline. Gel type synthetic zeolites can be prepared, for example, by adding alkali in controlled proportions to acid solutions of aluminum sulfate and sodium silicate, or by the reaction of sodium silicate with a variety of aluminum salts such as sodium aluminate. Amorphous synthetic zeolites that are produced in this manner are among the preferred ion exchange compositions for use in the present invention. These zeolites have a high base exchange capacity and an essentially macroporous structure.

The zeolites that can be used in the present invention expressed in terms of moles can be represented as follows:

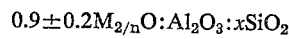

$$0.9 \pm 0.2 M_{2/n}O : Al_2O_3 : xSiO_2$$

wherein "M" is selected from the group consisting of hydrogen, monovalent and divalent metal cations and mixtures thereof: "$n$" is its valence, and "$x$" is a number from about 1.5 to about 12, said value being dependent upon the particular type of zeolite. The cation represented by "M" in the above formula will usually be a monovalent alkali metal cation, e.g., sodium, lithium or potassium before the zeolite is treated with a metal salt to produce the hydrocarbon treating material of the present invention.

In addition to inorganic base exchange materials of the type described above, synthetic organic cation and anion exchangers can be used in the process. Among the cation exchangers are the sulfonated phenolic and more particularly the sulfonated styrene base resins. The preparation of sulfonated styrene-divinyl benzene strong acid cation exchange resins is described in U.S. Patent 2,366,007. The sulfonic acid phenolformaldehyde resins are prepared by condensing a phenol sulfonic acid with formaldehyde. In general, resins having a plurality of sulfonic acid groups are useful in producing the compositions of the present invention. Weak acid cation exchange resins having carboxylic groups as the functional sites can also be used in the present invention.

The anion exchange resins which can be used in the practice of the invention include both strongly basic anion exchange resins, i.e., anion exchange resins which in the hydroxide form are capable of converting inorganic salts in an aqueous solution directly to hydroxides, and weakly basic anion exchange resins. Thus, a strongly basic anion exchange resin is capable of converting an aqueous solution of sodium chloride directly to an aqueous solution of sodium hydroxide. A strongly basic anion exchange resin can also be defined as one which on titration with hydrochloric acid in water free from electrolytes has a pH above 7.0 when the amount of hydrochloric acid added is one-half of that required to reach the inflection point (equivalence point). A weakly basic anion exchange resin under the same conditions has a pH below 7.0 when one-half of the acid required to reach the equivalence point has been added. The strongly basic anion exchange resins which are available commercially are characterized by the fact that the exchangeable anion is a part of a quaternary ammonium group. The quaternary ammonium group has the general structure:

wherein $R_1$, $R_2$ and $R_3$ represent alkyl or substituted alkyl groups, and $X^-$ is a monovalent anion.

Examples of the strongly basic anion exchange resins which can be employed in the practice of the invention are those resins disclosed in U.S. Patents 2,591,573, 2,597,440, 2,597,494, 2,614,099, 2,630,427, 2,632,000 and 2,632,001.

Weakly basic anion exchange resins of the polyamine type can also be employed in the invention. The commercially available product Dowex 3 is a material of this type. Weakly basic anion exchange resins show little or no salt-splitting capacity. Such resins are highly ionized only when in salt form and, therefore, have an anion exchange activity below pH 7.

The synthetic organic ion exchange resins that are useful in the subject process also include the chelate resins which can be prepared, for example, by reacting a chloromethylated styrene-divinyl benzene copolymer with iminodiacetic acid. The resultant resin has cation exchange capacity and is usually used in the sodium or ammonium form.

The macroporous or macroreticular cation exchange resin which can be used in the subject process preferably is a copolymer of about 60–98% of a monovinyl aromatic compound and about 2–40% of a divinyl compound, preferably a divinyl aromatic compound crosslinked together in a gel structure having macroporosity. The ion exchange sites on the resin are sulfonic acid groups provided by sulfonation of the resins, which sulfonic acid groups are placed in the metal form by contacting the sulfonic acid resin with an aqueous solution of a suitable metal salt, e.g., copper sulfate, copper acetate, mercury nitrate, mercury acetate, etc.

The preferred organic ion exchange resins for use in the invention are macroporous or macroreticular cation exchange resins having a macroporous or macroreticular, hard gel structure provided with a plurality of sulfonic acid groups as the exchange sites. In the form used in the invention, sulfonic acid groups are in the metal++ form, in which form the metal++ ion is held on two sulfonic acid groups in the resin structure.

The preferred cation exchange resins of the invention are crosslinked copolymers of about 60–98% of a monovinyl aromatic compound, such as styrene, vinyl toluene, ethyl styrene, alpha-methyl styrene, vinyl naphthylene or acenaphthalene, and about 2–40% of a polyvinyl aromatic compound, such as divinyl benzene. Less preferably, the polyvinyl compound may be ethylene, dimethacrylate, vinylacrylate, vinylmethacrylate, divinyloxylate, divinyl ketone or styryl vinyl ketone.

There are several methods for preparing the aforesaid resins described in the prior art. By way of example, reference is made to British Patents 754,521 and 860,695, Canadian Patents 625,753 and 674,860, German Patent 1,045,102 and U.S. Patent 3,021,288.

The foregoing resins are sulfonated by procedures also well known in the art. An exemplary method for sulfonating a styrene-divinyl benzene gel copolymer comprises reacting the copolymer with concentrated sulfuric acid at elevated temperature to introduce sulfonic acid groups. See also U.S. Patent Nos. 2,366,077 and 2,500,149.

As is apparent from the above cited references, the primary distinctions between the process for producing microporous cation exchange resins and the process for producing macroporous cation exchange resins include: (1) the amount of crosslinking agent, and (2) the amount of solvent that is used in the process. The skeleton of a macroporous resin tends to be more rigid than that of a microporous resin. The pores of a macroporous resin will still exist when it is in a dry state, whereas the pores of a normal microporous resin shrink when the resin is dried. With a macroporous resin, liquid will enter the pre-existing holes of a dried resin, whereas with a microporous resin the liquid is absorbed by an expansion of the crosslinked network. The amount of surface available to the hydrocarbon to be treated is substantially greater with macroporous resins than with microporous resins. The sweetening capacity of microporous resins is low as compared with macroporous resins unless (1) the resin is ground to an extremely fine particle size, or (2) the resin is an oil swelling type such as a styrene-butadiene resin. In general, microporous resins and crystalline aluminosilicates can be modified to have at least one square meter per gram, and preferably at least three square meters per gram, of surface area available to the hydrocarbon. Both the synthetic amorphous zeolites and the synthetic organic macroporous ion exchange resins will have substantially greater surface area available to the hydrocarbon and therefore are highly acceptable from this standpoint.

The hydrocarbons with which the invention is concerned are liquid hydrocarbons capable of flowing through a bed of resin at the treatment temperature. These liquid hydrocarbons may be liquid alkanes, liquid alkenes, liquid aromatics, such as benzene, toluene and/or xylene, liquid cycloaliphatic hydrocarbons, such as cyclohexane, and mixtures thereof. Exemplary hydrocarbon compositions are mixtures of $C_6$ to $C_{18}$ aliphatic hydrocarbons, kerosene, light virgin naphtha, heavy virgin naphtha, 12 pound virgin naphthas, light catalytically cracked naphtha, heavy catalytically cracked naphtha, 12 pound catalytically cracked naphtha, naphthenes, jet fuels, and the like.

The mercaptan impurity in the liquid hydrocarbons has the formula of RSH wherein R is the hydrocarbon radical of the mercaptan. It may be a $C_1$ to $C_{20}$ alkyl or alkenyl group, an aromatic hydrocarbon group, such as phenyl or phenyl which is ring-substituted with 1–3 alkyl groups of 1–12 carbons, naphthyl, phenyl which is ring-substituted with 1–3 hydroxy groups, etc., aralkyl, such as benzyl, phenyl ethyl and the like wherein the alkyl group has 1–8 carbons, cycloalkyl, such as cyclohexyl, cyclooctyl, and the like wherein the cycloalkyl group has 5–8 ring carbons, and like groups which normally occur as the nuclei of the mercapto compounds found as impurities in the various kinds of liquid hydrocarbons.

As was pointed out above, in preparing the subject sweetening agent, the sodium ion of the natural or synthetic zeolite molecule is replaced by a metallic ion taken from Groups I–B, II–B, IV, V, VI and VIII of the Periodic Table. The preferred metal ions are cupric, mercuric, silver, lead, cobaltic, ferric, platinum and palladium.

The following examples illustrate a method by which treating agents of the present invention can be formed.

EXAMPLE 1

Five hundred (500) ml. of settled volume of a synthetic amorphous zeolite was rinsed with DI water in a beaker to remove fines and to reduce the pH of the composition to 9.0. The material was placed in a 5 liter plastic funnel fitted with a sintered glass disc at the narrow end. The function of the glass disc was to admit air or water. The disc also served as a drain means. A quantity of 94 g. of $CuSO_4 \cdot 5H_2O$ (equivalent to 1.5 meq. of $Cu^{++}$ per ml. of zeolite) was dissolved in 3 liters of DI water and mixed with the zeolite by blowing air through the glass disc for a period of 2 hours. After rinsing out the $CuSO_4$ solution with water, the water was displaced by pouring through several liters of isopropyl alcohol. Cu analysis was 0.86 meq. Cu/ml.

EXAMPLE 2

In this example 2 liters of a synthetic amorphous zeolite was placed in a plastic funnel of the type described in Example 1. The zeolite was backwashed with DI water to remove fines and to reduce the pH to 9.0. A quantity of 500 g. of $CuSO_4 \cdot 5H_2O$ (equivalent to 2.0 meq. of Cu per ml. of zeolite) was dissolved in 5.420 g. of DI water to make a 15.6% solution. This was passed downflow through the zeolite at a rate of 134 ml./min. (equivalent to ½ g.p.m./cu. ft.). Afterwards the zeolite was rinsed free of $CuSO_4$ solution with DI water; rinsed with several liters of isopropyl alcohol; drained; and then the zeolite was bottled. The zeolite analyzed 1.1 meq. Cu/ml. of zeolite.

As was indicated above, the treating agent can also be a complex of the metal zeolite or resin composition. These metal complexes are prepared by contacting the metal zeolite or resin with the complexing agent preferably dissolved in a solvent. In a preferred embodiment, ammonia or an amine dissolved in a solvent such as water or an organic medium is used as the complexing agent. Organic solvents that can be used in forming the complex include N-butanol, isopropanol, benzene, kerosene, naphtha, acetone, dimethyl sulfoxide, dimethyl formamide, carbon tetrachloride, methanol, ethanol, o-butyrolactone, and mixtures of any of the above such as benzene-isopropanol and benzene-methanol. In addition to ammonia, amines including primary, secondary and tertiary amines, diamines, polyamines, heterocyclic amines, and aromatic amines can be used in the process. Specific amines include methyl amine, ethyl amine, propyl amine, butyl amine, ethylene diamine, N-methylethylenediamine, N-ethyl-ethylenediamine, propylene diamine, diethylene triamine, tetraethylene pentamine, pentaethylene hexamine, and aniline. Pyridine is considered a heterocyclic amine and can be used in carrying out the subject invention. In certain instances the amines are used alone, but in most cases the amines are dissolved in an organic solvent of the type described above. Aqueous solutions of amines or ammonia can also be employed in the process. Additional metal complexing agents include oxalic acid, lactic acid, gluconic acid, tartaric acid, citric acid, salicylic acid, 5-sulfosalicyclic acid, disodium-1,2-dihydroxybenzene - 3,5 - disulfonate, 8-hydroxyquinoline-5-sulfonic acid, nitroacetic acid, pyrophosphoric acid, n-methylglycine, glycine, n-ethylglycine, n-propylglycine, n-butylglycine, n-isopropylglycine, alpha-alanine, beta-alanine, norvaline, leucine, phenylalanine, tyrosine, serine, threonine, l-ornithine, asparagine, lysine, arginine, proline, glutamic acid, glycylglycine, etc. Additional organic complexing agents are listed in the text "Organic Sequestering Agents" by Chaberek & Martell, John Wiley & Sons, Inc. (1959), pages 505–580.

The following examples illustrate the subject sweetening process.

EXAMPLE 3

A mercaptan solution containing 300 p.p.m. of mercaptans comprising 135 p.p.m. of mixed butyl mercaptans, 135 p.p.m. mixed amyl mercaptans, 12 p.p.m. mixed heptyl mercaptans, and 18 p.p.m. thiocresols in Stoddard solvent ($C_8$ to $C_{12}$ aliphatic hydrocarbons) was prepared to provide a solution having a standardized mercaptan content. This solution was flowed through a bed of macroreticular styrene-divinyl benzene sulfonic acid ion exchange resin in the $Cu^{++}$ form (80% styrene, 20% divinyl benzene) at ambient temperature, atmospheric pressure, and a flow rate of six hourly space velocity, i.e., six volumes of hydrocarbon solution per bed volume per hour.

After the resin was spent, it was regenerated by steam comprising a water volume equivalent of 5 bed volumes of the resin at a temperature in the resin column of 225° to 250° F. under 24–27 in. Hg vacuum. The steam was condensed and collected.

Over 15 cycles, the total bed volumes of mercaptan-containing hydrocarbon was an average of 57 bed volumes per cycle. This means that a 57 volume quantity of hydrocarbon was sweetened per bed volume of catalyst. A doctor sweet product is one having no more than six parts per million of mercaptan sulfur. Total sulfur analysis of the sweetened hydrocarbon effluents from the first, fourth, and seventh cycles were respectively, 179, 160, and 125 average p.p.m. S at respective bed volumes of 60, 56, and 48.

Using the same volume of steam with air added thereto for regeneration, instead of steam alone, an average of 52 bed volumes per cycle was realized over 15 cycles. Total sulfur analysis of the sweetened hydrocarbon effluents from the first, fourth, and seventh cycles were respectively, 196, 112, and 205 average p.p.m. S at respective bed volumes of 60, 63, and 185.

The resin used in the foregoing example was a macroreticular styrene-divinyl benzene resin having sulfonic acid ion exchange sites in the $Cu^{++}$ form having the trade designation, Amberlite 200. The resin in the $Cu^{++}$ form had a 1.5 meq. $Cu^{++}$ per milliliter of resin. Also, in the previous example, the traces of water accrued during steam regeneration in the resin bed were removed by soaking the cooled resin in isopropanol which was thereafter washed out with the hydrocarbon feed at the beginning of the next sweetening cycle.

EXAMPLE 4

Kerosene containing 101 p.p.m. mercaptan and having a Saybolt color of +25 was sweetened with the resin in the $Cu^{++}$ form, described in Example 3 above, over six cycles. The spent resin was regenerated by steam as described in Example 1. Color of the kerosene after treating and after five weeks standing was still +25. Resin capacities for the six cycles were 60, 66, 48, 52, 48, and 36 bed volumes, an average of 51 bed volumes of kerosene per cycle. As was pointed out above, this means that 57 volumes of kerosene per volume of catalyst bed were sweetened before it was necessary to regenerate the catalyst.

Mercaptan and disulfide analysis of steam regeneration condensates were made in both Examples 3 and 4. In Example 3, the steam condensate (steam regeneration) had a mercaptan analysis of less than 6 p.p.m. and a disulfide analysis of 340 p.p.m., while the vacuum cold trap had an analysis of 100 p.p.m. mercaptan and 26 p.p.m. disulfide. In the steam and air regeneration process of Example 3, the steam condensate had a mercaptan analysis of less than 6 p.p.m. and a disulfide analysis of 72 p.p.m., while the vacuum cold trap had an analysis of less than 6 p.p.m. mercaptans and 100 p.p.m. disulfides. The steam condensate analysis of Example 4 was less than 6 p.p.m. mercaptans and 79 p.p.m. disulfides, while the vacuum cold trap analysis was less than 6 p.p.m. mercaptans and 15 p.p.m. disulfides.

EXAMPLE 5

The mercaptan reduction capacity of the $Cu^{++}$ resin in the process of Example 3 (steam regeneration) was evaluated. Over the first 72 bed volumes, the mercaptan content of the sweetened hydrocarbon remained consistently below the "doctor" sweet level of 6 p.p.m. mercaptans. Over the next 130 bed volumes, the mercaptan content of the sweet effluent rose somewhat to a mercaptan content in the sweet effluent of 5–20% based on the original 300 p.p.m. mercaptans content of the hydrocarbon feed. The latter values can be decreased by employing a multistage resin unit or a longer bed to increase resin capacity per unit volume of resin.

EXAMPLE 6

In this example various natural and synthetic zeolites of the formula $Na_2O \cdot Al_2O_3 \cdot 6SiO_2 \cdot xH_2O$ (sold under the trademark Aridzone AAA) were used to remove mercaptans from hydrocarbon feeds. The results of the tests are expressed in terms of sweetening number. The concept of sweetening number was derived to overcome the problem of correlating widely varying mercaptan content feeds. Sweetening number permits the analysis of data from a wide variety of mercaptan content feeds on a roughly equivalent basis. Sweetening number is the product of the mercaptan content in parts per million multiplied by the bed volumes of naphtha treated:

Sweetening number = (p.p.m.) (bed volumes)

The use of this concept has resulted in the successful correlation of data from a variety of feedstocks.

In certain of the tests described in the table below the feed was aerated with an oxidizing agent such as air or molecular oxygen.

It is usually most advantageous to operate the process at temperatures of 100° F. to 250° F. and pressures sufficiently high to maintain the liquid phase. The sweetening capacity of the zeolite resin at temperatures above 100° F. is improved. The invention, however, can be practiced at varying pressures, e.g., absolute pressures as low as 25–50 mm. Hg vacuum and as high as several atmospheres, e.g., 5–10 atmospheres. The flow rate of the liquid hydrocarbon depends upon the desired degree of sweetening, the exchange capacity of the resin and like factors. Thus, the flow rates of about 1–25 volumes of the hydrocarbon liquid per volume of the bed per hour can be used. It is usually preferable to operate at an hourly space velocity of 3 to 12, and most preferable 6–9 at a temperature of 100 °F. 150° F.

Where cupric ion is used in the process, the mercaptan sulfur impurity in the liquid hydrocarbon is removed in part from the liquid hydrocarbon in the form of a cuprous mercaptide of the formula CuSR, while the remainder of the mercaptan sulfur is carried over in the liquid hydrocarbon in the form of disulfide, RSSR, wherein R in the foregoing formula represents the organic residue of the mercaptan impurities. The reaction mechanism is believed to be essentially as follows:

(1) $2Cu^{++}$ ion exchange base $+ 4RSH \rightarrow 2Cu^+SR$
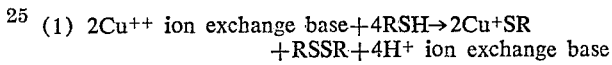

Utilizing the above ion exchange reaction alone, one is able to get high sweetening numbers, for example, of from 70,000 to 80,000 and up. In a preferred embodi-

TABLE I

| Catalyst | Reactor Pressure | Reactor Temp., °F. | LHSV | Feed and Spiking | Sweetening Number |
|---|---|---|---|---|---|
| Copper Exchanged Zeolite, pretreated with NH₃, 50 ml., 1.06 Loading. | ATM | 100 | 12 | 100-120 p.p.m. n-Butyl Mercaptan in LCN¹. | Cycle 1, 40,300;² Regeneration, running nil. |
| Copper Exchanged Zeolite, 1.06 Loading. | ATM | 100 | 12 | -----do----- | Cycle 1, 40,600;² Regeneration, running 3.2 p.p.m. |
| Copper Exchanged Zeolite. 50 mil., 1.06 Loading, Sized, 35 to +40 sieve. | ATM | 75-85 | 12 | 100-120 p.p.m., 50 50 n-Butyl Mercaptan and Thiophenol in LCN. | Cycle 1, 282,000;² Regeneration, terminated. |
| Copper Exchanged Zeolite, 50 mil., 1.06 Loading, Sized, 40 to +50 sieve. | ATM | 75-85 | 12 | -----do----- | Cycle 1, 324,000;² Regeneration, terminated. |
| Copper Exchanged Zeolite pretreated with NH₃, 300 ml., 1.06 Loading, No sizing of catalyst. | 40 p.s.i. | 100 | 6 | -----do----- | Cycle 1, 129,000;² Regeneration, running nil. |
| Copper Exchanged Zeolite, 50 ml., 1.06 Loading, Sized, 16 to +20 sieve. | ATM | 75-85 | 12 | 100-120 p.p.m. n-Butyl Mercaptan in LCN. | Cycle 1, 259,000;² Regeneration, terminated. |
| Copper Exchanged Zeolite, 50 ml., 1.06 Loading, Sized, 20 to +30 sieve. | ATM | 75-85 | 12 | -----do----- | Cycle 1, 257,000;² Regeneration, terminated. |
| Copper Exchanged Zeolite, 50 ml., 1.06 Loading, Sized, 30 to +35 sieve. | ATM | 75-85 | 12 | -----do¹----- | Cycle 1, 277,000;² Regeneration, terminated. |
| Copper Exchanged Zeolite, 50 ml., 1.06 Loading. | ATM | 75-90 | 12 | 100-120 p.p.m. n-Butyl Mercaptan in LVN.⁴ | Cycle 1, 860,000; Regeneration, 2.0% NH₃ in IPA (8);³ Cycle 2, 200,000. |
| Copper Exchanged Zeolite, 50 ml., 1.06 Loading, Pretreated with NH₃. | ATM | 75-90 | 12 | -----do----- | Cycle 1, 64,500. |
| Copper Exchanged Zeolite, 50 ml., 1.06 Loading. | ATM | 75-90 | 12 | -----do----- | Cycle 1, 49,000; Regeneration, 3% NH₃ in n-butanol (7);³ Cycle 2, 70,000. |
| Copper Exchanged Zeolite, 50 ml., 1.06 Loading, Pretreated with ethylenediamine, Reactor, ¾" glass column. | 0 | 75-90 | 12 | -----do----- | Cycle 1, 42,000; Regeneration, 2.8% NH₃ in IPA (9);³ Cycle 2, 12,400. |
| Copper Exchanged Zeolite, 50 ml., 1.06 Loading, Pretreated with Tartaric Acid, Reactor, ¾" glass column | 0 | 75-90 | 12 | -----do----- | Cycle 1, 820,000; Regeneration, 3% NH₃ in IPA (9)³ sat'd with air; Cycle 2, 344,000. |
| Copper Exchanged Zeolite, 300 ml., 1.06 Loading. Pretreated with NH₃, Reactor, 1½" metal column. | 35 p.s.i.g. | 120 | 12 | 100 p.p.m. mixed alkyl Mercaptans in LVN.⁴ | Cycle 1, 1,345,000 (running nil with terminated). |
| Copper Exchanged Zeolite, 50 ml., 1.06 Loading. | ATM | 75-90 | 12 | 100-120 p.p.m. n-Butyl Mercaptan in LCN.¹ | Cycle 1, 63,500; Regeneration, 2.8% NH₃ in IPA (12);³ Cycle 2, 35,600; Regeneration, 2.8% NH₃ in IPA (13);³ Cycle 3, 35,000. |
| Copper Excahnged Zeolite, 50 ml., 1.06 Loading, Pretreated with Tartaric Acid. | ATM | 75 90 | 12 | -----do¹----- | Cycle 1, 56,200. |
| Copper Exchanged Zeolite, 50 ml., 1.06 Loading, Pretreated with EDTA. | ATM | 75-90 | 12 | -----do----- | Cycle 1, 57,000; Regeneration, 3% NH₃ in IPA (7)³ sat'd with air; Cycle 2, 45,800; Regeneration, 3% NH₃ in IPA (9)³ sat'd with air; Cycle 3, 51,000. |
| Copper Exchanged Zeolite, 50 ml., 1.06 Loading, Pretreated with Sec-Butyl-Phenylenediamine. | ATM | 75-90 | 12 | -----do----- | Cycle 1, 59,000. |

In certain of the tests set out in the above table the run was terminated without regeneration, while in other tests the mercaptan content of the treated hydrocarbon was nil at that point in the run.

In carrying out the process the sour hydrocarbons are brought into intimate contact with the sweetening agent at temperatures in the range of about 50° F. to 300° F.

ment of the invention the $Cu^{++}$ ion exchange base can be partially regenerated in situ by adding air or oxygen to the feed. In such cases the following reaction would also take place:

(2) $2CuSR + O_2 + 4H^+$ ion exchange base $\rightarrow RSSR$
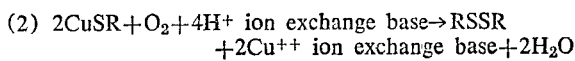

Where both reactions 1 and 2 above take place, extremely high sweetening numbers are possible up to 1,000,000 or more as is apparent from Table I. It follows, therefore, that while the subject process can be carried out without aerating or otherwise adding oxygen to the feed, the addition of oxygen to the feed constitutes a preferred embodiment of the invention.

Both natural and synthetic zeolites as well as glauconites and other aluminosilicates having base exchange capacity are useful in practicing the present invention as are strong acid and weak acid cation exchange resins and strong base and weak base anion exchange resins. The preferred amorphous zeolites and macroporous resins have a pore diameter range of from 50 to 2,000 A. and most often from 100–1100 A. The average pore diameter of the macroporous resins is about 300 A. although other macroporous resins have an average or mean pore diameter of about 100 A. units. The synthetic amorphous zeolites have average pore diameters of about 100 A. These materials have a great number of pores in the 50–150 A. range.

Where the ion exchange material is a microporous synthetic organic resin or crystalline zeolite, the material if necessary should be finely ground such that the surface area available to the hydrocarbon to be treated will be at least one square meter per gram, and preferably at least three square meters per gram. This is also true of the so-called molecular sieves which can also be used in the process provided sufficient surface area is available to the hydrocarbons.

In a further preferred embodiment of the invention, water is incorporated in the hydrocarbon feed in order to prevent a collapse or volume loss of the ion exchange agent. It has been found that if the aluminosilicate or organic resin contains at least 5% $H_2O$, the capacity of the composition is greatly increased. Preferably, the resin or aluminosilicate should contain from 5 to 50% water, and most preferred 15–35% water, by weight based on the weight of the composition. In this embodiment, sufficient water is added to the hydrocarbon feed-stock to maintain the water content at these levels. Typically, the addition of from 100 to 1,000, and preferably from 300 to 600 p.p.m. $H_2O$, will maintain a proper water content in the resin or aluminosilicate.

Obviously many modifications and variations of the invention as hereinbefore set forth may be made without departing from the spirit and scope thereof, and therefore only such limitations should be imposed as are indicated in the appended claims.

We claim:
1. A process for sweetening sour hydrocarbon compositions which comprises: contacting a liquid hydrocarbon containing organic mercaptans of the formula RSH with a particulate material selected from the group consisting of
   (1) an aluminosilicate ion exchange composition having at least one square meter per gram of surface area available to said hydrocarbon and containing an ionically bound metal selected from the group consisting of copper, mercury, silver, lead, cobalt, iron, platinum, and palladium.
   (2) a synthetic organic resin ion exchange composition containing an ionically bound metal selected from the group consisting of copper, mercury, silver, lead, cobalt, iron, platinum, and palladium, whereby organic mercaptans are converted to disulfides of the formula RSSR wherein R in the formula represents the hydrocarbon residue of the organic mercaptans, and separating the sweetened hydrocarbon composition from said particulate material.
2. A process as in claim 1 wherein the metal ion is the mercuric ion.
3. A process for sweetening sour hydrocarbon compositions which comprises: contacting a liquid hydrocarbon containing organic mercaptans of the formula RSH with a particulate material selected from the group consisting of
   (1) an aluminosilicate ion exchange composition having at least one square meter per gram of surface area available to said hydrocarbon and containing cupric ion, and
   (2) a synthetic organic resin ion exchange composition containing cupric ion,
whereby organic mercaptans are converted to disulfides of the formula RSSR wherein R in the formula represents the hydrocarbon residue of the organic mercaptans, and separating the sweetened hydrocarbon composition from said particulate material.
4. A process for sweetening sour hydrocarbon compositions which comprises: contacting a liquid hydrocarbon containing organic mercaptans of the formula RSH with a particulate material, said particulate material being a macroporous, sulfonic acid ion exchange resin containing an ionically bound metal selected from the group consisting of copper, mercury, silver, lead, cobalt, iron, platinum, and palladium, whereby organic mercaptans are converted to disulfides of the formula RSSR wherein R in the formula represents the hydrocarbon residue of the organic mercaptans, and separating the sweetened hydrocarbon composition from said particulate material.
5. A process for sweetening sour hydrocarbon compositions which comprises: contacting a liquid hydrocarbon containing organic mercaptans of the formula RSH with a particulate material, said particulate material being an amorphous synthetic zeolite having at least one square meter per gram of surface area available to said hydrocarbon and containing an ionically bound metal selected from the group consisting of copper, mercury, silver, lead, cobalt, iron, platinum, and palladium, whereby organic mercaptans are converted to disulfides of the formula RSSR wherein R in the formula represents the hydrocarbon residue of the organic mercaptans, and separating the sweetened hydrocarbon composition from said particulate material.
6. A process for sweetening sour hydrocarbon compositions which comprises: contacting a liquid hydrocarbon containing organic mercaptans of the formula RSH with a particulate material, said particulate material being a macroporous, sulfonic acid ion exchange resin containing an ionically bound and complexed metal selected from the group consisting of copper, mercury, silver, lead, cobalt, iron, platinum, and palladium, whereby organic mercaptans are converted to disulfides of the formula RSSR wherein R in the formula represents the hydrocarbon residue of the organic mercaptans, and separating the sweetened hydrocarbon composition from said particulate material.
7. A process for sweetening sour hydrocarbon compositions which comprises: contacting a liquid hydrocarbon containing organic mercaptans of the formula RSH with a particulate material, said particulate material being a synthetic amorphous zeolite having at least one square meter per gram of surface area available to said hydrocarbon and containing an ionically bound and complexed metal selected from the group consisting of copper, mercury, silver, lead, cobalt, iron, platinum, and palladium, whereby organic mercaptans are converted to disulfides of the formula RSSR wherein R in the formula represents the hydrocarbon residue of the organic mercaptans, and separating the sweetened hydrocarbon composition from said particulate material.
8. A process for sweetening sour hydrocarbon compositions which comprises: contacting a liquid hydrocarbon containing organic mercaptans of the formula RSH with a particulate material, said particulate material having a mean pore diameter of from 50–2000 A., said particulate material being selected from the group consisting of
   (1) an aluminosilicate ion exchange composition having at least one square meter per gram of surface area available to said hydrocarbon and containing an ionically bound metal selected from the group consisting of copper, mercury, silver, lead, cobalt, iron, platinum, and palladium, and (2) a synthetic organic resin ion exchange composition containing an ionically bound metal selected from the group consisting of copper, mercury, silver, lead, cobalt, iron, platinum, and palladium, whereby organic mercaptans are converted to disulfides of the formula RSSR wherein R in the formula represents the hydrocarbon residue of the organic mercaptans, and separating the sweetened hydrocarbon composition from said particulate material.

9. A process for sweetening sour hydrocarbon compositions which comprises: contacting a liquid hydrocarbon containing organic mercaptans of the formula RSH at a temperature of 50° F.–300° F. with a particulate material selected from the group consisting of (1) an aluminosilicate ion exchange composition having at least one square meter per gram of surface area available to said hydrocarbon and containing an ionically bound metal selected from the group consisting of copper, mercury, silver, lead, cobalt, iron, platinum and palladium, and (2) a synthetic organic resin ion exchange composition containing an ionically bound metal selected from the group consisting of copper, mercury, silver, lead, cobalt, iron, platinum, and palladium, whereby organic mercaptans are converted to disulfides of the formula RSSR wherein R in the formula represents the hydrocarbon residue of the organic mercaptans, and separating the sweetened hydrocarbon composition from said particulate material.

10. A process for sweetening sour hydrocarbon compositions which comprises: contacting a liquid hydrocarbon containing organic mercaptans of the formula RSH with a particulate material, said particulate material being a macroporous, sulfonic acid ion exchange resin containing cupric-ammonia complex ion, whereby organic mercaptans are converted to disulfides of the formula RSSR wherein R in the formula represents the hydrocarbon residue of the organic mercaptans, and separating the sweetened hydrocarbon composition from said particulate material.

11. A process for sweetening sour hydrocarbon compositions which comprises: contacting a liquid hydrocarbon containing organic mercaptans of the formula RSH with a particulate material, said particulate material being an amorphous synthetic zeolite containing cupric-ammonia complex ion, whereby organic mercaptans are converted to disulfides of the formula RSSR wherein R in the formula represents the hydrocarbon residue of the organic mercaptans, and separating the sweetened hydrocarbon composition from said particulate material.

12. A process for sweetening sour hydrocarbon compositions which comprises: contacting a liquid hydrocarbon to which has been added a material selected from the group consisting of oxygen and oxygen-containing gas and containing organic mercaptans of the formula RSH with a particulate material selected from the group consisting of:

(1) an aluminosilicate ion exchange composition having at least one square meter per gram of surface area available to said hydrocarbon and containing an ionically bound metal selected from the group consisting of copper, mercury, silver, lead, cobalt, iron, platinum and palladium, and (2) a synthetic organic resin ion exchange composition containing an ionically bound metal selected from the group consisting of copper, mercury, silver, lead, cobalt, iron, platinum, and palladium, whereby organic mercaptans are converted to disulfides of the formula RSSR wherein R in the formula represents the hydrocarbon residue of the organic mercaptans, and separating the sweetened hydrocarbon composition from said particulate material.

13. A process for sweetening sour hydrocarbon compositions which comprises: contacting a liquid hydrocarbon to which has been added from 100–1000 p.p.m. of water and containing organic mercaptans of the formula RSH with a particulate material selected from the group consisting of (1) an aluminosilicate ion exchange composition having at least one square meter per gram of surface area available to said hydrocarbon and containing an ionically bound metal selected from the group consisting of copper, mercury, silver, lead, cobalt, iron, platinum and palladium, and (2) a synthetic organic resin ion exchange composition containing an ionically bound metal selected from the group consisting of copper, mercury, silver, lead, cobalt, iron, platinum, and palladium, whereby organic mercaptans are converted to disulfides of the formula RSSR wherein R in the formula represents the hydrocarbon residue of the organic mercaptans, and separating the sweetened hydrocarbon composition from said particulate material.

14. A process for sweetening sour hydrocarbon compositions which comprises: contacting a liquid hydrocarbon selected from the group consisting of kerosene and naphtha and containing organic mercaptans of the formula RSH at a temperature of from 50° F.–300° F. with a particulate material selected from the group consisting of (1) an aluminosilicate ion exchange composition having at least one square meter per gram of surface area available to said hydrocarbon and containing an ionically bound metal selected from the group consisting of copper, mercury, silver, lead, cobalt, iron, platinum and palladium, and (2) a synthetic organic resin ion exchange composition containing an ionically bound metal selected from the group consisting of copper, mercury, silver, lead, cobalt, iron, platinum, and palladium, whereby organic mercaptans are converted to disulfides of the formula RSSR wherein R in the formula represents the hydrocarbon residue of the organic mercaptans, and separating the sweetened hydrocarbon composition from said particulate material.

15. A process for sweetening sour hydrocarbon compositions which consists essentially of contacting sour hydrocarbon composition containing organic mercaptans of the formula RSH with particles of a macroporous, sulfonic acid ion exchange resin in the $Cu^{++}$ form and thereby converting the organic mercaptans to disulfides of the formula RSSR wherein R in the formulae represents the hydrocarbon residue of the organic mercaptans, and separating the hydrocarbon composition from the resin.

16. A process for sweetening sour hydrocarbon compositions which consists essentially of flowing a sour hydrocarbon composition containing organic mercaptans of the formula RSH through a bed of a macroporous, sulfonic acid ion exchange resin in the $Cu^{++}$ form and thereby converting the organic mercaptans to disulfides of the formula RSSR wherein R in the formulae represents the hydrocarbon residue of the organic mercaptans, and regenerating the spent resin by passing steam through the spent resin bed at a temperature of about 225°–250° F. under vacuum.

17. A process for sweetening sour hydrocarbon compositions which consists essentially of flowing a sour hydrocarbon composition containing organic mercaptans of the formula RSH through a bed of beads of a cross-linked styrene-divinyl benzene copolymer with sulfonic acid exchange sites in the $Cu^{++}$ form and thereby converting the organic mercaptans to disulfides of the formula RSSR wherein R in the formulae represents the hydrocarbon residue of the organic mercaptans.

References Cited

UNITED STATES PATENTS

| | | | |
|---|---|---|---|
| 2,367,803 | 1/1945 | Schindler | 208—194 X |
| 2,730,486 | 1/1956 | Coonradt et al. | 210-32 |
| 3,051,646 | 8/1962 | Brooke | 208—193 |
| 3,108,948 | 10/1963 | Ring | 208—189 |
| 3,173,855 | 3/1965 | Miale et al. | 208—45 X |
| 3,175,967 | 3/1965 | Miale et al. | 208—46 X |
| 3,192,152 | 6/1965 | Maze et al. | 208—191 |

FOREIGN PATENTS 1,001,428  8/1965  England.

DELBERT E. GANTZ, *Primary Examiner.*

R. H. SHUBERT, G. J. CRASANAKIS,
*Assistant Examiners.*

UNITED STATES PATENT OFFICE
CERTIFICATE OF CORRECTION

Patent No. 3,378,484                                                   April 16, 1968

John M. Ferrara et al.

It is certified that error appears in the above identified patent and that said Letters Patent are hereby corrected as shown below:

Column 1, line 51, "objcets" should read -- objects --; line 69, "6Sio$_2$" should read -- 6SiO$_2$ --. Column 2, line 2, after "The" insert -- most --. Column 5, line 23, "5.420" should read -- 5,420 --. Column 8, line 15, after "100° F." insert -- to --. Columns 7 and 8, TABLE I, first column, lines 5 and 7 thereof, "50 mil", each occurrence, should read -- 50 ml --; same table, same column 1, line 37 thereof, "Excahnged" should read -- Exchanged --; same table, insert the following footnotes:

[1]Light catalytic Naphtha.
[2]Denotes aerated feed.
[3]Denotes number of 8 hour washes.
[4]Light virgin Naphtha.

same table, sixth column, line 28 thereof, "with" should read -- when --.

Signed and sealed this 21st day of April 1970.

(SEAL)
Attest:

EDWARD M. FLETCHER, JR.                         WILLIAM E. SCHUYLER, JR.
Attesting Officer                                       Commissioner of Patents